United States Patent [19]
Hopkins et al.

[11] Patent Number: 5,658,462
[45] Date of Patent: Aug. 19, 1997

[54] PROCESS FOR RECOVERING PROTEIN, FATTY AND WATER COMPONENTS FROM A FLOAT MATERIAL PRODUCED BY A WASTE WATER TREATMENT SYSTEM

[75] Inventors: Matthew B. Hopkins, Kennesaw; Robert J. DeRosa, Marietta, both of Ga.

[73] Assignee: Water Specialists, Inc., Marietta, Ga.

[21] Appl. No.: 599,479

[22] Filed: Jan. 23, 1996

[51] Int. Cl.$^6$ ................................................ B01D 11/00
[52] U.S. Cl. .................. 210/633; 210/703; 210/774; 210/781; 210/783; 210/804; 210/511; 210/737; 210/738
[58] Field of Search ...................... 210/633, 634, 210/703, 704, 705, 804, 805, 806, 511, 774, 781, 783, 784, 737, 738

[56] References Cited

U.S. PATENT DOCUMENTS

| | | | |
|---|---|---|---|
| 4,981,599 | 1/1991 | Stewart Jr. | 210/725 |
| 5,053,140 | 10/1991 | Hurst | 210/704 |
| 5,173,190 | 12/1992 | Picek | 210/651 |
| 5,174,903 | 12/1992 | Miller | 210/725 |
| 5,372,724 | 12/1994 | Ahmed | 210/668 |
| 5,413,720 | 5/1995 | Miller | 210/725 |
| 5,458,780 | 10/1995 | Evans | 210/634 |
| 5,458,789 | 10/1995 | Dickerson et al. | 210/750 |

OTHER PUBLICATIONS

The Smell of Success in Manure, Article from Fertilizer International No. 327; pp. 15–17, Nov. 1993.

Drying of Alum Sludge Using the Carver–Greenfield Process, Paul L. Lau, Contra Costa Water District, Concord, CA; publication date—unknown.

Conversion of Biosolids to Fertilizer with the Carver–Greenfield Process, National Meeting of the American Chemical Society; J. Holcombe & J. Sukkel, Aug. 1992.

The Carver–Greenfield Process; Dehydro–Tech Corporation; Applications Analysis Report, U.S. Environmental Protection Agency; EPA Document No. EPA/540/AR–92/002, Aug. 1992.

*Primary Examiner*—Robert Popovics
*Attorney, Agent, or Firm*—Jones & Askew, LLP

[57] ABSTRACT

A process for recovering protein, fatty and water components from a float material produced by a waste water treatment system, wherein the protein and fatty components can be further processed for inclusion in various products, such as animal feed. The recovered water component can also be further processed before discharge into a sewer system.

10 Claims, No Drawings

PROCESS FOR RECOVERING PROTEIN, FATTY AND WATER COMPONENTS FROM A FLOAT MATERIAL PRODUCED BY A WASTE WATER TREATMENT SYSTEM

TECHNICAL FIELD

This invention relates to the components of a float material which is produced from a waste water treatment system. In a more specific aspect, this invention relates to a process for recovering (i.e., separating) certain of these components to provide an industrial plant with increased efficiency and profitability with regard to the by-products generated by the plant.

BACKGROUND OF THE INVENTION

Most cities and counties have enacted requirements for industries which discharge water into the municipal sewer systems. These municipalities generally require the waste water to meet certain standards before being discharged into the sewer systems, and these standards usually relate to the level of pollutants which interfere with the efficient operation of the municipal waste water treatment facility.

Waste water which contains materials having a high biochemical oxygen demand, total suspended solids and ammonia increase the treatment cost to the city or county. The term "biochemical oxygen demand" ("BOD") refers to the quantity of oxygen utilized in the biochemical oxidation of organic matter; and the term "total suspended solids" ("TSS") refers to the total suspended solids which float on the surface of, or are suspended in, waste water and which are removable by filtering.

In some instances, a surcharge may be levied on an industrial plant that produces waste water which does not meet the standards as established by the municipality. For example, these standards may prohibit waste water containing greater than 300 mg/liter of BOD, 300 mg/liter of TSS, and/or 18 mg/liter of ammonia. Cities and counties may also prohibit industrial plants from discharging waste water having an oil and grease concentration greater than 150 mg/liter.

A city or county also has the authority to revoke an industrial plant's waste water discharge permit if that plant continues to discharge waste water which does not meet the standards set by that city or county. Therefore, an industrial plant must effectively treat its waste water to reduce the level of pollutants and thereby meet such standards.

An effective waste water treatment process for an industrial plant should cause the solid organic and inorganic matter to flocculate and form a sludge cake. This sludge cake accumulates to a certain thickness and is then separated from the liquid component of the waste water and sent to a rendering plant for further processing. If the resulting sludge cake is under 18% solids, the rendering plant may impose a surcharge because sludge with a high percentage of water is more expensive for the rendering plant to process.

One method of treating waste water from an industrial plant is disclosed in Stewart U.S. Pat. No. 4,981,599. This process results in the formation of a sludge cake on top of the waste water. The sludge cake is removed, and the treated waste water is discharged into the sewer system.

However, the sludge cake (also referred to as the float material) produced by the Stewart process is not ideally suited for subsequent treatment at a rendering plant because (1) the water content of the float material is higher than desired and (2) the float material is comprised of fatty and protein components which desirably should be separated from the water component.

Therefore, a need exists for a process which can be used to separate the protein, fatty and water components of a float material produced by a waste water treatment system. Additionally, this process should provide protein and fatty components with a high percentage of solids (i.e., a low percentage of water content).

SUMMARY OF THE INVENTION

Briefly described, the present invention provides a process for separating a float material, which is produced by a waste water treatment system at an industrial plant, into certain components which can then be further processed as necessary to enhance their subsequent utility. More specifically, these components may be defined as protein, fatty and water components.

This invention also provides a process by which the water content of the separated protein and fatty components has been decreased.

The process of this invention may be generally defined as (1) mixing a float material with a heated carrier material to form a substantially homogenous mixture having an excess of carrier material, (2) separating a protein component from the mixture and (3) then separating the remaining portion of the mixture into a fatty component and a water component. The separated or recovered components can be further processed as desired to meet specific uses. Alternatively, the fatty component can be recycled into this process to provide increased efficiency.

The sequence of steps in the above process is critical in order to effectively recover the protein, fatty and water components from the starting float material.

The process of this invention allows for optional steps to aid in the processing of a particular float material. For example, a float material which is difficult to separate into its protein, fatty and water components could be processed twice through the mixing step prior to separation of the protein component. Additionally, certain chemicals, such as dispersants, can be used as necessary.

The present invention provides protein, fatty and water components which have been recovered from a float material and which can be used in subsequent operations (e.g., rendering) well known in the industry.

Accordingly, an object of this invention is to provide a process for the treatment of a float material produced by a waste water treatment system.

Another object of this invention is to provide a process for the treatment of a float material produced by a waste water treatment system utilized by an industrial plant.

Another object of this invention is to provide a process by which a float material produced by a waste water treatment system can be separated into protein, fatty and water components.

Another object of this invention is to process a float material produced by a waste water treatment system to recover a protein component which has a high solids content.

Another object of this invention is to process a float material produced by a waste water treatment system to recover a fatty component which has a low water content.

Still another object of this invention is to process a float material produced by a waste water treatment system to recover a water component which can be discharged into a sewer system.

Still another object of this invention is to provide a process for the treatment of a float material produced by a waste water treatment system, wherein the process does not employ flash evaporation or other process steps designed to evaporate water.

These and other objects, features and advantages of this invention will become apparent from the following detailed description.

BRIEF DESCRIPTION OF THE INVENTION

In accordance with the present invention, certain components (protein, fatty and water) are recovered from a float material by a process which comprises the following steps:

- A. heating a carrier material to a temperature within the range of room temperature to about 210° F.;
- B. mixing the heated carrier material with a float material for a time period of about 30 seconds to about 1 hour to form a substantially homogenous mixture in which the ratio of float material:carrier material is from 1:1 to about 1:20;
- C. subjecting the mixture to a solids separation step to recover a protein component from the mixture; and
- D. subjecting the remaining portion of the mixture to a physical separation step to recover a water component and a fatty component;

wherein the recovered fatty component has a moisture content of less than about two percent by weight.

For purposes of this invention, the following definitions are important:

(1) float material—the sludge cake or solids material which is produced from an industrial plant by a waste water treatment system.

(2) protein component—the proteinaceous material, principally animal protein, which is recovered from the float material.

(3) fatty component—the liquid component which is recovered from the float material and which principally comprises fats, oils and greases.

(4) water component—water recovered from the float material.

As a first step in this invention, a carrier material (also referred to as a solvent) is heated to a temperature between room temperature and about 210° F., preferably from about 170° F. to about 190° F. The carrier material preferably is an animal fat or mixture of animal fats. Examples of other suitable carrier materials are synthetic oils, natural oils and mixtures thereof. The carrier material should be clean and edible so that further processing as a component for animal feed is possible.

Heating is necessary to provide a liquid or flowable form of the carrier material which will enhance its use in this invention. The liquefied carrier material can then be used to "pull" or "extract" the fatty component from the float material during the mixing step.

The heating temperature has a maximum of about 210° F. in order to minimize the evaporation of water and other volatile substances from the carrier material.

The heating step can be carried out using methods and apparatus which are well known in this industry, such as by steam in a jacketed vessel.

As a second step, the heated carrier material and the float material are mixed for a time period sufficient to obtain a substantially homogenous mixture. This time period will generally range from at least 30 seconds to about 1 hour and is dependent upon the characteristics of the carrier and float materials. A preferred time period is from about 15–30 minutes.

During the mixing step, we have found that an effective weight ratio of float material:carrier material to produce a substantially homogenous mixture is from 1:1 to about 1:20, preferably from 1:3 to about 1:10.

The mixing step can be accomplished in conventional fashion using well known mixing equipment, such as a vessel having a stirring mechanism.

The substantially homogenous mixture is then subjected to a solids separation step to recover a protein component from the mixture. Although other types of conventional solids separation equipment can be used, a preferred apparatus utilizes a shaker screen in which the mixture is placed into contact with one or more screens (i.e., filters) which progressively screen out and discharge the protein component. The remaining portion of the mixture, which principally comprises the water and fatty components, passes through the screen(s) and is discharged through an opening located in the lower portion of the equipment.

For practical reasons, all proteinaceous matter cannot be recovered in the solids separation step. However, we have found that the recovered protein component will generally have a solids content of at least about 25 percent by weight, preferably at least about 30–40 percent by weight. In certain situations, the solids content may exceed 50 percent by weight.

The remaining portion of the mixture is then subjected to a further processing step designed to physically separate the water component and the fatty component. Again, various types of physical separation equipment can be used, but we have found that a conventional carrier can be used effectively. The mixture is introduced into one compartment of a two-compartment clarifier, after which the fatty component (which is lighter in weight than the water component) begins to rise toward the top. After reaching the top of a baffle which separates the two compartments, the lighter fatty component flows over the baffle into the second compartment. The heavier water can be discharged from the bottom of the first compartment for further processing or into the sewer system if all discharge requirements have been met.

The fatty component is discharged from the bottom of the second compartment and can then be recycled into this process as the carrier material or can be transported to a rendering plant for further processing into animal feed, etc.

Other types of apparatus which can be used in the physical separation step of this process include a centrifuge, rotary vacuum filter and a belt press. These apparatus and other mechanical dewatering equipment are well known in the industry.

As explained with reference to the protein component, the water and fatty components may contain impurities. However, the fatty component will generally have a water content of less than about 2 percent by weight.

The process of this invention can be effectively used in either a batch or continuous system. For reasons of process economy, a continuous system is preferred.

During the practice of this invention, various systems and controls can be employed to monitor and control the process steps and the flow rate of the various substances. These systems and controls can be based on computer calculations and/or manual adjustments.

The present invention is further illustrated by the following example which is illustrative of certain embodiments designed to teach those of ordinary skill in the art how to practice this invention and to represent the best mode contemplated for carrying out this invention.

EXAMPLE

A quantity of animal fat (i.e., the carrier material) is heated using steam in a jacketed vessel until the temperature of the liquefied animal fat is within the range of 170°–190° F. The liquefied animal fat is then pumped into a mixer equipped with a stirring mechanism. Simultaneously, the float material produced by a waste water treatment system at a food processing plant is introduced into the mixer.

The heated carrier material and float material are mixed for approximately 30 minutes until a substantially homogenous mixture is obtained. The mixture is then pumped into a shaker screen apparatus having 3 concentric screen sections of 80 (top), 120 (middle) and 150 (bottom) mesh sizes. The screens permit the water and fatty components of the mixture to pass through, and these components are subsequently discharged through an opening located at the bottom of the apparatus.

The screen sizes are selected so that the protein component will not pass through in any substantial amount but, instead, will be screened and discharged from the apparatus through openings located immediately after each screen but before the next screen or bottom opening. The protein component, which is discharged from the apparatus is collected and then transported to a rendering plant, has a solids content of about 30–40 percent by weight.

The remaining portion of the mixture which is discharged from the bottom of the shaker screen apparatus is primarily comprised of the fatty and water components. This portion is pumped to a clarifier apparatus, which is rectangular and has 2 compartments separated by a baffle. The mixture is pumped into a first compartment after which the water component, being heavier than the fatty component, begins to sink toward the bottom. As additional mixture from the shaker screen apparatus is introduced into the first compartment, the level rises toward the top of the baffle. When the level reaches the top of the baffle, the lighter fatty component spills over into the second compartment. The fatty component, which has a moisture content of less than 2 percent by weight, is discharged from the second compartment and can be recycled into this process or transported to a rendering plant.

To maintain the proper level in the first compartment, the water component is discharged from the bottom of the first compartment. This component can be further treated, as necessary, before discharge into a municipal sewer system or used in other applications.

This invention has been described in detail with particular reference to certain embodiments, but variations and modifications can be made without departing from the spirit and scope of the invention as defined in the following claims.

What is claimed is:

1. A process of treating a float material produced by a waste water treatment system, wherein the float material comprises a protein component, a fatty component and a water component, wherein the process comprises the sequential steps of:

A. heating an animal fat carrier material into which a fatty component is dissolved to a temperature within the range of room temperature to about 210° F.;

B. mixing the heated carrier material with a float material for a time period of about 30 seconds to about 1 hour to form a substantially homogenous mixture in which the ratio of float material:carrier material is from 1:1 to about 1:20;

C. subjecting the mixture to a separation step to recover a protein component from the mixture; and D. subjecting the remaining portion of the mixture to a separation step to recover a water component and a fatty component, wherein the separation step is conducted using means selected from the group consisting of gravity separation, centrifugal separation, vacuum filtration and belt press filtration;

wherein the recovered fatty component has a moisture content of less than about two percent by weight.

2. A process as defined by claim 1 wherein the protein component is comprised of animal protein.

3. A process as defined by claim 1 wherein the fatty component is comprised of fats, oils and greases.

4. A process as defined by claim 1 wherein the carrier material is a mixture of animal fats.

5. A process as defined by claim 1 wherein the carrier material is heated to a temperature of about 170° F. to about 190° F.

6. A process as defined by claim 1 wherein the heated carrier material and float material are mixed for a time period of about 15–30 minutes.

7. A process as defined by claim 1 wherein the ratio of float material:carrier material is from 1:3 to about 1:10.

8. A process as defined by claim 1 wherein the recovered protein component has a solids content of at least about 25 percent by weight.

9. A process as defined by claim 1 wherein the recovered protein component has a solids content of at least about 30 percent by weight.

10. A process of treating a float material produced by a waste water treatment system, wherein the float material comprises a protein component, a fatty component and a water component, wherein the process comprises the sequential steps of:

A. heating an animal fat carrier material into which a fatty component is dissolved to a temperature within the range of about 170° F. to about 190° F.;

B. mixing the heated carrier material with a float material for a time period of about 15 minutes to about 30 minutes to form a substantially homogenous mixture in which the ratio of float material:carrier material is from 1:3 to about 1:10;

C. subjecting the mixture to a separation step to recover a protein component from the mixture; and D. subjecting the remaining portion of the mixture to a separation step to recover a water component and a fatty component, wherein the separation step is conducted using means selected from the group consisting of gravity separation, centrifugal separation, vacuum filtration and belt press filtration;

wherein the recovered fatty component has a moisture content of less than about two percent by weight.

* * * * *